United States Patent
Roth et al.

(10) Patent No.: US 6,452,955 B1
(45) Date of Patent: Sep. 17, 2002

(54) METHOD FOR FEEDING FINES OR GRANULES INTO A LIGHT-ARC FURNACE

(75) Inventors: Jean-Luc Roth, Thionville (FR); Serge Devillet, Buerden; Emile Lonardi, Bascharage, both of (LU)

(73) Assignee: Paul Wurth S.A., Luxembourg (LU)

( * ) Notice: Subject to any disclaimer, the term of this patent is extended or adjusted under 35 U.S.C. 154(b) by 0 days.

(21) Appl. No.: 09/806,991
(22) PCT Filed: Sep. 30, 1999
(86) PCT No.: PCT/EP99/07255
§ 371 (c)(1),
(2), (4) Date: Jun. 14, 2001
(87) PCT Pub. No.: WO00/20815
PCT Pub. Date: Apr. 13, 2000

(30) Foreign Application Priority Data

Oct. 6, 1998 (LU) .................................. 90293

(51) Int. Cl.⁷ .................................................. F27D 3/00
(52) U.S. Cl. .......................................... 373/82; 373/79
(58) Field of Search ................................ 373/9, 79–82; 75/10.29, 10.45

(56) References Cited

U.S. PATENT DOCUMENTS

| | | | |
|---|---|---|---|
| 3,215,522 A | * 11/1965 | Kuhlmann | 373/82 |
| 3,471,626 A | * 10/1969 | Weese et al. | 373/82 |
| 3,940,551 A | 2/1976 | Ling et al. | |
| 4,079,185 A | 3/1978 | Collin | |
| 4,133,968 A | * 1/1979 | Frolov | 373/82 |
| 4,146,390 A | 3/1979 | Widell | |
| 4,147,887 A | * 4/1979 | Yasukawa et al. | 373/79 |
| 4,410,996 A | * 10/1983 | Svensson | 373/9 |
| 5,733,356 A | * 3/1998 | Konig et al. | 75/10.29 |
| 5,923,698 A | * 7/1999 | Loebner et al. | 373/82 |

FOREIGN PATENT DOCUMENTS

| | | |
|---|---|---|
| CH | 653201 A5 | 12/1985 |
| DE | 2536083 A1 | 2/1977 |
| DE | 36 21 323 | 1/1987 |
| DE | 19612383 C1 | 7/1999 |
| EP | 0 557 020 | 8/1993 |
| GB | 811803 | 4/1959 |
| GB | 1 435 184 | 5/1976 |

\* cited by examiner

Primary Examiner—Tu Ba Hoang
(74) Attorney, Agent, or Firm—Oblon, Spivak, McClelland, Maier & Neustadt, P.C.

(57) ABSTRACT

A method for feeding fines or granules into a light-arc furnace. A hollow electrode provided with a feeding channel is utilized, and is preferably a hollow Söderberg electrode. A conveyor introduces the fines or granules into the feeding channel so as to maintain in the feeding channel a hollow material in which a lower end is smelted in a molten metal bath.

11 Claims, 1 Drawing Sheet

METHOD FOR FEEDING FINES OR GRANULES INTO A LIGHT-ARC FURNACE

Figure 1:
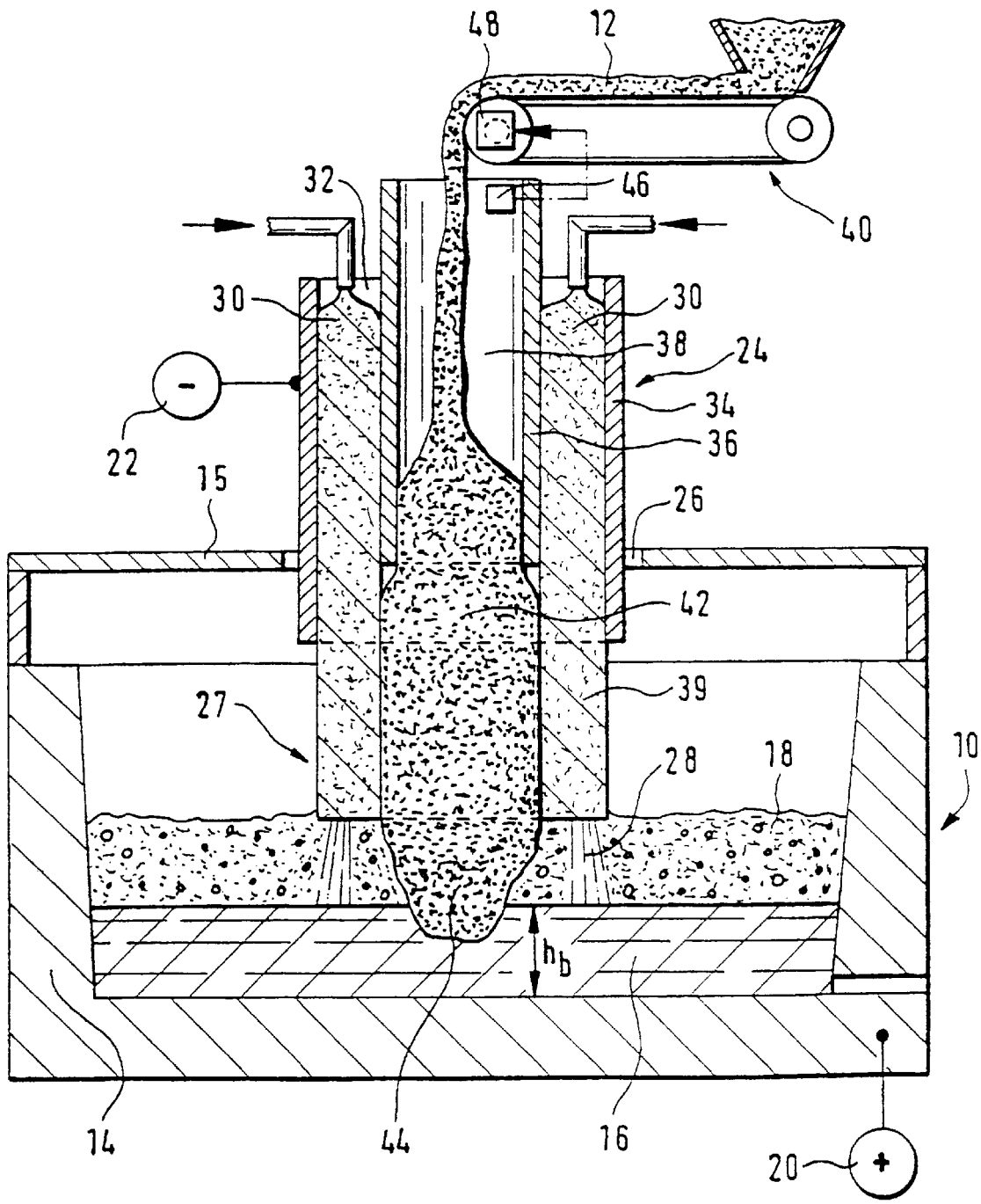

The present invention relates in a general way to a method for charging an arc furnace with fines or granules. It relates more particularly to the charging of an arc furnace, used for the production of steels or ferroalloys, with pre-reduced iron ore in the form of fines or granules

STATE OF THE ART

Regarding arc furnaces producing steel from scrap iron, it is known to replace part of the charge of scrap iron with pre-reduced iron ore. For this purpose, the pre-reduced iron ore is loaded in the form of pellets or briquettes that are simply allowed to fall through an opening in the roof of the furnace into the molten bath. These pellets or briquettes pass through the slag covering the bath of steel and melt without difficulty in contact with the molten steel.

Since nowadays methods appear for producing pre-reduced iron ore in the form of fines (grain sizes generally below 3 mm) or granules (grain sizes generally between 3 mm and 20 mm) and since the manufacture of pellets or briquettes is in any case accompanied by the formation of fines, it would be attractive to be able to charge the furnace directly with the pre-reduced iron ore in the form of fines or granules. However, such a charging with fines or granules presents major problems. Firstly, a considerable proportion of the fines is carried away by the smoke while they are being poured into the arc furnace. Secondly, the fines or granules poured into the arc furnace have a tendency to float on a layer of slag covering the surface of the metallic bath instead of making contact with the metallic bath so that they pass into the bath in a molten state. This means not only that the pre-reduced iron ore is inadequately melted, but also that the formation of foaming slag is disturbed and that the efficiency of the arc or arcs is reduced.

In order to facilitate the introduction of fines into the metallic bath, it has been proposed that a blowing lance be used to inject the fines in suspension in a carrier gas into the bath of molten metal and to do this in the immediate neighborhood of the point of impact of a free arc (or plasma arc) on the metallic bath. This method means that advantage is taken of a descending current in this region of the metallic bath for carrying the fines rapidly into the molten bath. However, the flow rate of fines that can be injected this way is low (on the order of 100 kg/min), there is a risk that the blowing might affect the stability of the plasma arc and it is almost impossible to introduce granules by this method.

In order to overcome the above-mentioned disadvantages, it has also been proposed to use worm conveyors to propel the fines into the slag or directly into the bath. However, such a method requires large investments and poses problems regarding spatial requirements.

It is known from the patent application CH-A-653 201 to inject fines of pre-reduced iron ore in suspension in a carrier gas through a hollow electrode in an arc furnace. It seems that this method has until now been applied only in small furnaces, or in any case for charging fines at low flow rates and with small grain sizes. It also seems that the electrodes used for implementing this method wear out very quickly, such wear being mainly due to intense mechanical abrasion caused by the pneumatic flow in the hollow electrode. It should also be noted that blowing fines through the electrode does have some effect on the plasma arc formed by the electrode, which imposes certain constraints as to the blowing parameters.

The patent application DE-A-196 12 383 proposes to limit the length of the electric arc in an arc furnace used for steel production by introducing coal or lime into the furnace through a hollow electrode. It also proposes, as an extra step, to add unwanted dust originating, for example, from industrial dust extractors. The means used to supply the hollow electrode with these additives consist mainly of conveyor belts and worm conveyors.

It is known from the patent application DE-A-25 36 083 to use a large-diameter hollow electrode unit baked in situ (i.e. a Söderberg type electrode) to extract, using a turbine, the smoke from an arc furnace which is used for the production of ferroalloys by the reduction of untreated fine or granulated ores. In this application, it is proposed to drop the charge, consisting of iron ore, pellets, pre-reduced iron ore, coal and dolomite, through the hollow electrode by which the smoke is simultaneously extracted from the arc furnace. This charge is heated up, dust is extracted from it and it is partially pre-reduced in the counter-current of the smoke.

From the document U.S. Pat. No. 4,146,390 a method is known in which fines or granules of iron ore and carbon are fed into an arc furnace by falling freely through a hollow graphite electrode.

From the document U.S. Pat. No. 3,940,551 a method is known in which fines or granules of iron ore are fed into an arc furnace by falling freely through a tube passing through a hollow graphite electrode. A gas is injected into the annular space between the tube and the inner wall of the electrode in order to confine the current of material to the output from the tube.

OBJECT OF THE INVENTION

The aim of the present invention is to propose a method for effectively charging an arc furnace with large quantities of fines or granules. In conformity with the invention, this problem is solved by a method according to the first claim.

GENERAL DESCRIPTION OF THE INVENTION

In order to charge a furnace with fines or granules or with a mixture of both, the present invention uses a hollow electrode unit provided with a central feed channel. According to an important feature of the present invention, the fines or granules are fed into the feed channel so as to maintain in the latter a column of material. In other words, the electrode unit is used as a "feed hopper" which is discharged by gravity into the immediate neighborhood of the metallic bath.

The intrinsic weight of the column of material pushes its lower end, consisting of fines or granules agglomerated in the meantime by heat, into the metallic bath. This lower end of the column of material, first heated up at the outlet from this channel at the center of the electric arc or arcs surrounding it, then immersed in the bath of molten metal, rapidly becomes molten. As its lower end progressively becomes molten, the column of material descends in the feed channel of the electrode unit. This descent is probably facilitated by a superficial melting of the column of material caused mainly by currents, which are set up in the column of material.

It should be particularly appreciated that the method according to the invention allows an arc furnace used for the production of steel or ferroalloys to be effectively charged with large quantities of a pre-reduced iron ore in the form of fines or granules. The method indeed has no effect either on the formation of a layer of foaming slag or on the characteristics of the electric arc. On the contrary, it ensures efficient pre-heating of the pre-reduced iron ore before its introduction into the metallic bath and an increased molten surface in the metallic bath itself.

Preferably, a column of material is maintained in the feed channel with a large enough height to produce a deep penetration of the lower end of the column of material into the metallic bath. Such a penetration is, for example, guaranteed when the column of material has a height substantially equal to:

$$h_b(\rho_{liq}/\rho_{sol})$$

where:

$h_b$=depth of the liquid bath below the electrode unit;

$\rho_{liq}$=mean specific gravity of the liquid phase in the metallic bath below the electrode unit;

$\rho_{sol}$=mean specific gravity of the solid phase in the column.

The rate of descent of the column of material in the hollow electrode will normally lie between 0.5 and 5 m/min. The feed channel has, over its whole length, a cross-section of flow with a diameter greater than 100 mm and preferably at least 0.25 times the outer diameter of the electrode. For reasons connected with the stability of the electrode unit, the diameter of the cross-section of flow will generally not be greater than 0.50 times the diameter of the electrode.

It is possible to use a graphite electrode provided with a feed channel, which preferably has a cross-section of flow with a diameter of 150 to 300 mm. In this case, it is possible to work with a plasma type arc, also called a free arc, in an arc furnace supplied simultaneously with pre-reduced iron ore in the form of fines or granules and scrap iron.

However, it is also possible to bake a hollow electrode in situ around the feed channel. The baking of such a hollow electrode then comprises the injection of an electrode paste into an annular space, defined between an outer metallic jacket and an inner metallic jacket. The paste solidifies in this annular space to form an electrode with an annular cross-section baked in situ. Such an electrode generally has a cross-section of flow with a diameter greater than 300 mm. It is normally used to produce electric arcs, which are mostly immersed in a layer of foaming slag covering the metallic bath.

DETAILED DESCRIPTION WITH RESPECT TO THE FIGURES

Other special features and characteristics of the invention will emerge from the detailed description of an advantageous embodiment, given below as an illustrative example, with reference to the appended drawing, which shows:

FIG. 1: a very schematic cross-section of an installation for the implementation of the method according to the invention.

FIG. 1 shows an electric furnace 10, powered by a DC supply and used for the production of steels and ferroalloys, while receiving a charge in the form of fines or granules 12, according to the method of the present invention, of a pre-reduced iron ore. In particular, one can see the shaft 14 and the roof 15 of the furnace 10. The reference number 16 denotes a metallic bath (i.e. a molten metal in liquid phase) in the shaft 14. This metallic bath 16 is covered by a layer of foaming slag 18.

The shaft 14 (or a hearth electrode not shown) is connected to the positive terminal 20 of an electrical power supply (not shown). A negative terminal 22 of this electrical power supply is connected to a hollow electrode unit, which is denoted in general by the reference number 24. This hollow electrode unit 24 passes vertically through an opening 26 in the roof 15, so that its lower end 27 is located in the layer of foaming slag 18 near the metallic bath 16. Electric arcs 28 are then set up in the layer of foaming slag 18, between the annular lower end 27 of the electrode unit 24, which is at a negative potential, and the metallic bath 16, which is at a positive potential.

The hollow electrode unit 24 represented is a Söderberg type electrode unit. This electrode is obtained by injecting, at the upper end of the electrode unit 24, a paste of self-hardening electrode 30 into an annular space 32, which is defined between an outer metallic jacket 34 and an inner metallic jacket 36. This electrode paste 30 solidifies in this annular space 32 under the effect of heat, so that a hollow electrode 39 made of graphite is baked in situ, the electrode being provided with a central channel 38 of fairly large diameter. As this graphite electrode 39 is progressively consumed at its lower end 27, it is reconstituted at its upper end and its height above the metallic bath 16 is readjusted. It should also be noted that the channel 38 is bounded at its upper part by the inner metallic jacket 36 and at its lower part by the solidified electrode paste.

In the represented installation, the fines or granules 12 are poured by a conveyor 40 into the central channel 38 of the electrode unit 24. According to an important feature of the present invention, the rate of flow of the fines or granules 12 poured into the feed channel 38 is adjusted so as to maintain in this channel 38 a column of material 42 with a sufficient height to make its lower end 44, in which the fines or granules are agglomerated due to the heat, penetrate the metallic bath 16. As its lower end 44 progressively becomes molten, the column of material 42 descends in the feed channel 38 of the electrode unit. This descent is also facilitated by a superficial melting of the column of material 42, mainly as a result of the currents, which are set up in the column of material.

The installation is provided with a sensor 46, which detects the upper level of the column of material 42 in the feed channel 38. This sensor 46 is connected to a regulator 48, which adjusts the speed of the conveyor 40 so as to maintain a prescribed level of material in the feed channel 38. It should be appreciated that, by acting on the level of material 42 in the feed channel 38, it is possible to modify the charge of fines or granules that becomes molten in the liquid bath.

EXAMPLE 1

For a furnace with a capacity of 5 t and with a bath of diameter 2.5 m, an electrode with a feed channel of diameter 30 cm is used to introduce 6 t/h of pre-reduced iron ore in the form of fines or granules. This corresponds to a rate of descent of the column of material 42 of about 1 m/min.

EXAMPLE 2

For a furnace with a capacity of 50 t and with a bath of diameter 4.5 m, an electrode with a feed channel of diameter 50 cm is used to introduce 60 t/h of pre-reduced iron ore in the form of fines or granules. This corresponds to a rate of descent of the column of material 42 of about 1 m/min.

What is claimed is:

1. A method for charging an arc furnace containing a metallic bath with fines or granules, said method comprising the steps of:

providing a hollow electrode unit having therein a feed channel; and feeding said fines or granules into said feed channel in such a way as to build up in said feed channel a column of material, which has a lower end that is in contact with said metallic bath and consists of fines or granules agglomerated under the effect of heat; and controlling the feeding of said fines or granules into said feed channel in such a way as to warrant that said column of material always has a weight that is large enough to push the lower end thereof into said metallic bath.

2. The method according to claim 1, wherein said fines or granules have as a principal constituent pre-reduced iron ore.

3. A method for charging an arc furnace with fines or granules, comprising the steps of:

providing a hollow electrode unit having therein a feed channel; and feeding said fines or granules into said feed channel in such a way as to maintain in the feed channel a column of material whose own weight pushes its lower end, including fines or granules agglomerated under an effect of heat, into a metallic bath;

wherein said column of material has a height that is substantially equal to:

$$h_b(\rho_{liq}/\rho_{sol})$$

wherein:

$h_b$=depth of the liquid bath below the electrode unit;

$\rho_{liq}$=mean specific gravity of the liquid phase in the metallic bath below the electrode unit;

$\rho_{sol}$=mean specific gravity of the solid phase in the column of material.

4. The method according to claim 1, wherein a rate of descent of the column of material in the hollow electrode is from 0.5 to 5 m/min.

5. The method according to claim 1, wherein said feed channel has, over its whole length, a cross-section of flow with a diameter greater than 100 mm.

6. The method according to claim 5, wherein a diameter of the cross-section of flow lies between 0.25 and 0.50 times an outer diameter of the electrode.

7. The method according to claim 1, wherein the hollow electrode is a graphite electrode, provided with a feed channel having a cross-section of flow with a diameter from 150 to 300 mm.

8. The method according to claim 1, wherein a hollow electrode is based in situ around said feed channel.

9. The method according to claim 8, wherein the providing of the hollow electrode comprises the steps of:

providing an outer metallic jacket and an inner metallic jacket defining an annular space therebetween; and injecting an electrode paste into said annular space, wherein said paste solidifies in said annular space to form an electrode with an annular cross-section baked in situ.

10. The method according to claim 9, wherein the feed channel formed in said electrode based in situ has a cross-section of flow with a diameter greater than 300 mm.

11. The method according to claim 10, wherein said electrode baked in situ produces electric arcs which are immersed to a large extent in a layer of foaming slag covering the metallic bath.

* * * * *